United States Patent [19]

Harrington et al.

[11] Patent Number: 5,572,879
[45] Date of Patent: Nov. 12, 1996

[54] METHODS OF OPERATING A REFRIGERATION UNIT IN PREDETERMINED HIGH AND LOW AMBIENT TEMPERATURES

[75] Inventors: Robert L. Harrington; Alan D. Gustafson, both of Eden Prairie, Minn.

[73] Assignee: Thermo King Corporation, Minneapolis, Minn.

[21] Appl. No.: 450,763

[22] Filed: May 25, 1995

[51] Int. Cl.⁶ .................................................... F25B 41/04
[52] U.S. Cl. ................................. 62/217; 62/209; 62/230
[58] Field of Search ........................... 62/133, 158, 157, 62/231, 217, 208, 209, 323.1, 323.3, 323.4, 230, 229, 228.1, 228.3, 228.4, 228.5, 226, 227

[56] References Cited

U.S. PATENT DOCUMENTS

| | | | |
|---|---|---|---|
| 3,751,940 | 8/1973 | Norbeck | 62/230 X |
| 4,270,361 | 6/1981 | La Barge | 62/217 X |
| 4,646,534 | 3/1987 | Russell | 62/228.4 |
| 4,977,751 | 12/1990 | Hanson | 62/81 |
| 4,977,752 | 12/1990 | Hanson | 62/115 |
| 5,197,670 | 3/1993 | Hanson et al. | 236/78 D |
| 5,201,186 | 4/1993 | Hanson | 62/126 |

*Primary Examiner*—Harry B. Tanner

[57] ABSTRACT

A method of controlling refrigerant pressure during elevated ambient temperature conditions in a refrigeration unit having a refrigerant compressor driven by a prime mover, and controllable suction line modulation. The method includes the steps of detecting the actual load PML on the prime mover, sensing the ambient temperature AA, and providing a dynamic load limit DLL as a function of the ambient temperature AA. The actual load PML is compared with the dynamic load limit DLL, and the suction line modulation is changed as a function of the comparison step to cause the actual load PML to follow the changing dynamic load limit DLL. The invention also includes a method of preventing excessive on-off cycling of a refrigeration unit during low ambient temperature conditions, with the refrigeration unit operating in a cycling start-stop mode to control the temperature of a conditioned space to a selected set point temperature SP. The latter method includes the steps of sensing the ambient temperature AA, and comparing the ambient temperature AA with the set point temperature SP. The on-off cycling rate of the refrigeration unit is determined when the comparison step finds the ambient temperature AA has a predetermined relationship with the set point temperature SP. A cycling rate upper limit is provided and compared with the actual on-off cycling rate. The suction line modulation is increased when the comparison step finds the cycling rate has reached the cycling rate upper limit.

18 Claims, 5 Drawing Sheets

FIG. 5

ROM LOOK-UP TABLE ELECTRIC DRIVE MOTOR — 63

| ΔAA | LLM (AMPERES) |
|---|---|
| 2 | 26 |
| 4 | 25 |
| 6 | 24 |
| ⋮ | ⋮ |
| 20 | 17 |
| 22 | 16 |
| 24 | 15 |

ROM LOOK-UP TABLE ENGINE — 63

| ΔAA | LLM (RPM) |
|---|---|
| 2 | X |
| 4 | X+10 |
| ⋮ | ⋮ |
| 24 | X+Y |

ROM LOOK-UP TABLE ENGINE — 63

| ΔAA | LLM (°C) |
|---|---|
| 2 | X |
| 4 | X−10 |
| ⋮ | ⋮ |
| 24 | X−Y |

— 70

5,572,879

METHODS OF OPERATING A REFRIGERATION UNIT IN PREDETERMINED HIGH AND LOW AMBIENT TEMPERATURES

TECHNICAL FIELD

The invention relates to methods of operating a refrigeration unit during high and low ambient temperature conditions, to reduce chance of a high pressure cut out (HPCO) stopping the refrigeration unit due to high refrigerant compressor during high ambient temperature conditions, and to prevent excessive on-off cycling of a refrigeration unit operated in a start-stop cycling mode, during certain low ambient temperature conditions.

BACKGROUND ART

It is common in refrigerant units to utilize a mechanical throttling valve in the suction line to protect the prime mover, engine or motor, which drives a refrigerant compressor, from overload. The mechanical throttling valve limits the compressor suction pressure to a predetermined maximum value, to ensure that the compressor prime mover is not overloaded. U.S. Pat. No. 4,977,751, which is assigned to the same assignee as the present application, teaches the use of a controllable, proportional modulation valve in the suction line to prevent prime mover overload, eliminating the need for the mechanical suction line throttling valve. A proportional modulation valve is already present in many refrigeration units to provide more precise temperature control adjacent to a selected set point temperature SP.

Refrigerants which utilize a chlorofluorocarbon (CFC), such as refrigerants R12 and R502, are being phased out, and replaced by refrigerants which are more environmentally friendly, such as R404A. While the newer refrigerants have the advantage of not utilizing chemicals which are suspected of having a depleting effect on stratospheric ozone ($O_3$), the newer refrigerants have different operating characteristics than the CFC refrigerants. For example, refrigerant R404A has a much steeper temperature-pressure curve than R502. As a result, we are experiencing shut downs on refrigeration units which utilize R404A during high ambient temperature conditions, due to a protective high pressure cut out switch (HPCO) functioning, notwithstanding controlling the suction line modulation valve to limit the load on the prime mover to a predetermined maximum value.

Thus, it would be desirable, and it is an object of the present invention, to reduce the incidence of refrigeration unit shutdowns due to high refrigerant discharge pressure.

When frozen loads, and other loads which do not require precise temperature control to prevent load damage, are being conditioned, it is common to select a start-stop cycling mode to control the temperature of a conditioned space to a predetermined band adjacent to a selected set point temperature, instead of utilizing a continuous operating mode. The start-stop cycling mode conserves fuel. However, it is possible during certain low ambient temperature conditions, such as when the ambient temperature is close to, or below, the cargo set point temperature SP for a frozen load, for the cycling rate to be excessive. An excessive rate would be that cycling rate where the mechanical wear and stress on system mechanical and electrical components due to stopping and starting offsets the fuel saving advantage.

Thus, it would be desirable, and it is another object of the invention, to prevent excessive cycling of a refrigeration unit set to operate in a cycle mode, during certain low ambient temperature conditions.

SUMMARY OF THE INVENTION

Briefly, the present invention includes a method of controlling refrigerant pressure during elevated ambient temperature conditions in a refrigeration unit having a refrigerant compressor driven by a prime mover. The refrigerant compressor has discharge and suction ports connected to a refrigerant flow path which includes controllable suction line modulation. The method includes the steps of detecting the actual load PML on the prime mover, sensing the ambient temperature AA, providing a dynamic load limit DLL as a function of the ambient temperature AA, comparing the actual load PML with the dynamic load limit DLL, and changing the suction line modulation as a function of the comparison step, in an attempt to maintain the refrigerant discharge pressure of the refrigeration unit below a predetermined value and thus prevent a HPCO shut down of the unit.

The invention also includes a method of preventing excessive on-off cycling of a refrigeration unit which operates in a cycling start-stop mode to maintain the temperature of a conditioned space in a predetermined temperature range adjacent to a selected set point temperature SP. This method includes the steps of sensing the ambient temperature AA, comparing the ambient temperature AA with the selected set point temperature SP, determining the on-off cycling rate of the refrigeration unit when the comparison step finds the ambient temperature AA has a predetermined relationship with the set point temperature SP, providing a cycling rate upper limit, comparing the on-off cycling rate with the cycling rate upper limit, and increasing the suction line modulation when the comparison step finds the cycling rate has a predetermined relationship with the cycling rate upper limit.

BRIEF DESCRIPTION OF THE DRAWINGS

The invention will become more apparent by reading the following detailed description in conjunction with the drawings, which are shown by way of example only, wherein:

FIG. 5 is a ROM map of a look-up table used by the program shown in FIG. 3 when the prime mover is the electric motor shown in FIG. 1A;

FIG. 6 is a ROM map of a look-up table used by the program shown in FIG. 3 when the prime mover is the internal combustion engine shown in FIG. 1B;

FIG. 7 is a ROM map of a look-up table used by the program shown in FIG. 3 when the prime mover is the internal combustion engine shown in FIG. 1C.

DESCRIPTION OF PREFERRED EMBODIMENTS

Figure 1:
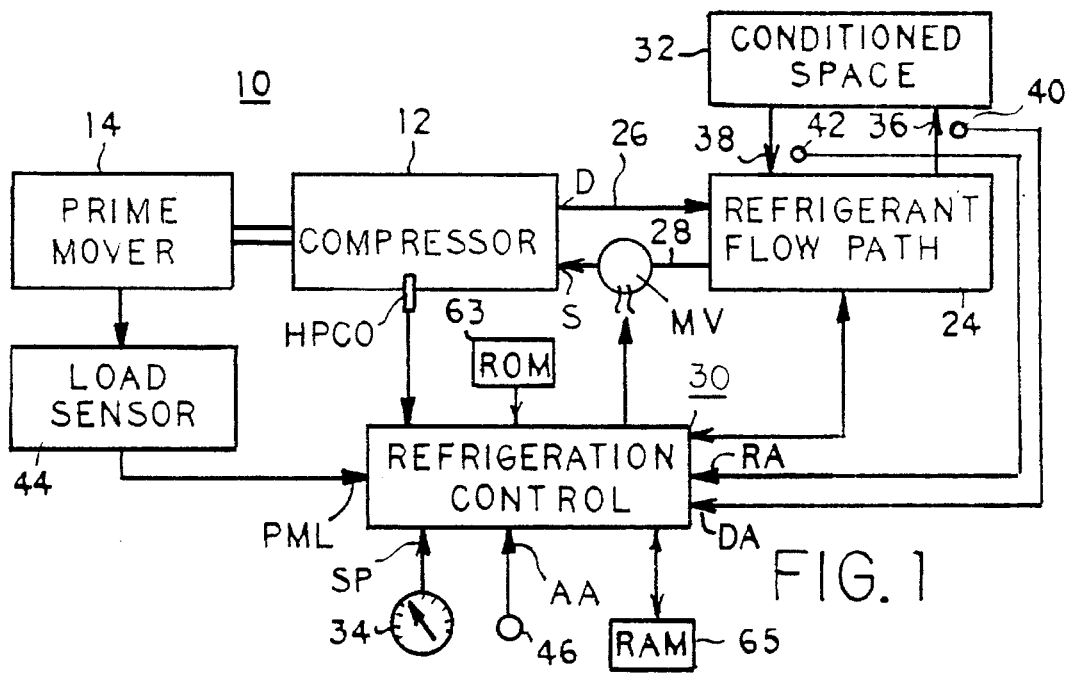
FIG. 1 is a partially block and partially schematic diagram of a refrigeration unit having a refrigerant compressor driven by a prime mover, which unit may be operated according to the teachings of the invention.
Figure 1A:
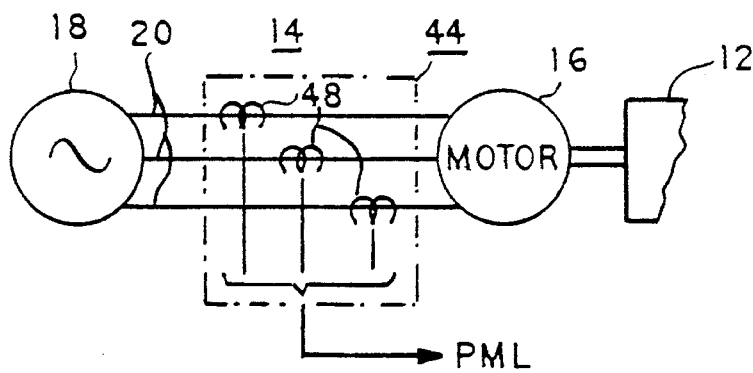
FIG. 1A illustrates the development of a signal PML responsive to the load on the compressor prime mover shown in FIG. 1, when the compressor prime mover is an electric motor.
Figure 1B:
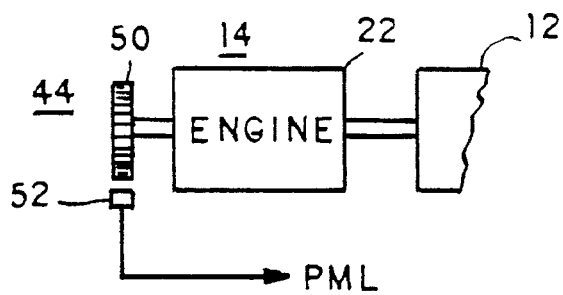
FIG. 1B illustrates the development of a signal PML responsive to the load on the compressor prime mover shown in FIG. 1, when the compressor prime mover is an internal combustion engine.
Figure 1C:
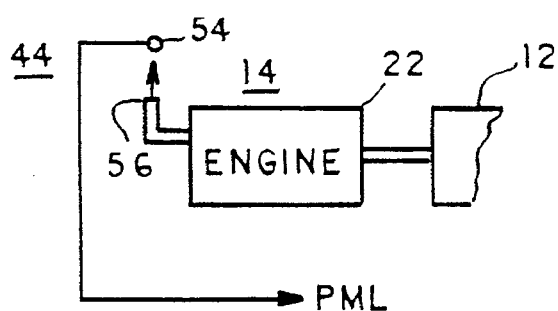
FIG. 1C is similar to FIG. 1B, except the load signal PML is developed in response to a different operating parameter of the internal combustion engine.

Referring now to the drawings, and to FIG. 1 in particular, there is shown a refrigeration unit 10, such as a transport refrigeration unit used with trucks, trailers, reefers, and the like. Refrigeration unit 10 includes a refrigerant compressor 12 driven by a prime mover 14. As shown in FIG. 1A, prime mover 14 may include an electric motor 16 which is connected to a source 18 of electric potential via conductors 20. Alternatively, as shown in FIGS 1B and 1C, prime mover 14 may include an internal combustion engine 22, such as a diesel engine. In certain transport refrigeration units, the prime mover 14 may include both an electric motor 16 and an engine 22, with the electric motor being used when a source 18 of electrical potential is available, and with the engine 22 being used when a source 18 of electrical potential is not available.

Compressor 12 includes discharge and suction ports D and S which are respectively connected to refrigerant flow paths 24 via hot gas and suction lines 26 and 28. A normally closed high pressure cut out switch HPCO senses the discharge pressure of compressor 12, with electrical contacts of the HPCO opening to initiate shut down of refrigeration unit 10 in the event a predetermined elevated pressure is detected. The electrical contacts of HPCO are connected in refrigeration control 30, such as in the circuit of an engine fuel solenoid, when prime mover 14 includes engine 22, and/or in a motor protecting trip circuit, when prime mover 14 includes electric motor 16.

An electrically controllable proportional modulation valve MV is connected in suction line 28. When the electrical current in a control coil associated with modulation valve MV is zero, modulation valve 28 is wide open and the suction line modulation is 0%. When refrigeration control 30 provides an electrical current flow in the control coil, modulation valve 28 is operated in a closing direction as the electrical control current is increased, which thus increases the percent modulation. When the control current reaches a predetermined value, the modulation valve is essentially closed which provides 100% suction line modulation. A ROM look-up table, for example, may be used by electrical refrigeration control 30 to correlate coil current with % modulation.

Electrical control 30 operates solenoid controlled valves, relays, and the like, associated with refrigerant flow paths 24, according to a predetermined temperature control algorithm, to maintain the temperature of a conditioned space 32 in a predetermined temperature zone or band close to a set point temperature SP, as selected by a set point temperature selector 34. Conditioned air 36 is discharged by refrigeration unit 10 into conditioned space 32, and air 38 to be conditioned is returned from the conditioned space 32 to refrigeration unit 10. Discharge air and return air temperature sensors 40 and 42 respectively provide temperature signals DA and RA for electrical control 30.

Typical refrigerant flow paths and typical refrigeration control, which may be used for the refrigerant flow paths 24 and refrigeration control 30 shown in block form in FIG. 1, are shown in detail in U.S. Pat. No. 5,201,186. Typical temperature control algorithms for both continuous and start-stop cycling modes are shown in U.S. Pat. No. 4,977,752. U.S. Pat. Nos. 5,201,186 and 4,977,752, which are assigned to the same assignee as the present application, are hereby incorporated into the specification of the present application by reference.

According to the teachings of the invention, a load sensor 44 provides a signal PML responsive to the actual load on prime mover 14, and an ambient temperature sensor 46 provides a signal AA responsive to the ambient temperature. The invention provides a dynamic load limit on the prime mover 14 as a function of the ambient temperature AA, in an attempt to reduce the chance of HPCO shutdowns during elevated ambient temperature conditions. The discharge temperature of a condenser coil in the refrigerant flow paths 24 is also an indication of ambient temperature, but direct measurement of the ambient air temperature, instead of an indirect measurement, is preferred, because of the time delay involved with an indirect measurement. During such a time delay the compressor discharge pressure could quickly increase and reach the HPCO setting, before it is known that the load on the prime mover 14 should be reduced by actuating modulation valve MV in a closing direction to increase the percent modulation.

As illustrated in FIG. 1A, when prime mover 14 includes an electric motor 16, load sensor 44 may include current transformers 48 inductively coupled with conductors 20 to provide a load current signal PML, which in this instant is measured in amperes. The load on motor 16 at any instant is directly proportional to the load current. While a temperature sensor in heat transfer relation with motor 16 could also be used to detect motor load, there would be an undesirable time delay between the actual load on motor 16 and the motor temperature. During such a time delay the compressor discharge pressure could increase quickly to the HPCO setting, before the compressor suction pressure is reduced by operating modulation valve MV in a closing direction to reduce the load on the prime mover 14.

When prime mover 14 includes an internal combustion engine 22, the actual load on engine 22 at any instant may be accurately and quickly followed by detecting engine speed. As illustrated in FIG. 1B, a toothed wheel 50 and a tooth detector 52 may be coupled to provide an actual load signal PML, which in this instant is measured in revolutions per minute (RPM). Alternatively, the frequency of an alternator (not shown) driven by engine 22 may be detected to determine engine RPM. Engine load is inversely proportional to engine speed, with the higher the load the lower the speed, and vice versa, between predetermined upper and lower speed limit values.

When prime mover 14 includes an internal combustion engine 22, the actual load on engine 22 may also be detected by sensing the temperature of engine exhaust gases. As illustrated in FIG. 1C, a temperature sensor 54 is disposed adjacent to engine exhaust conduit 56, to provide an actual load signal PML, which in this instance is measured in ° C.

Figure 2:
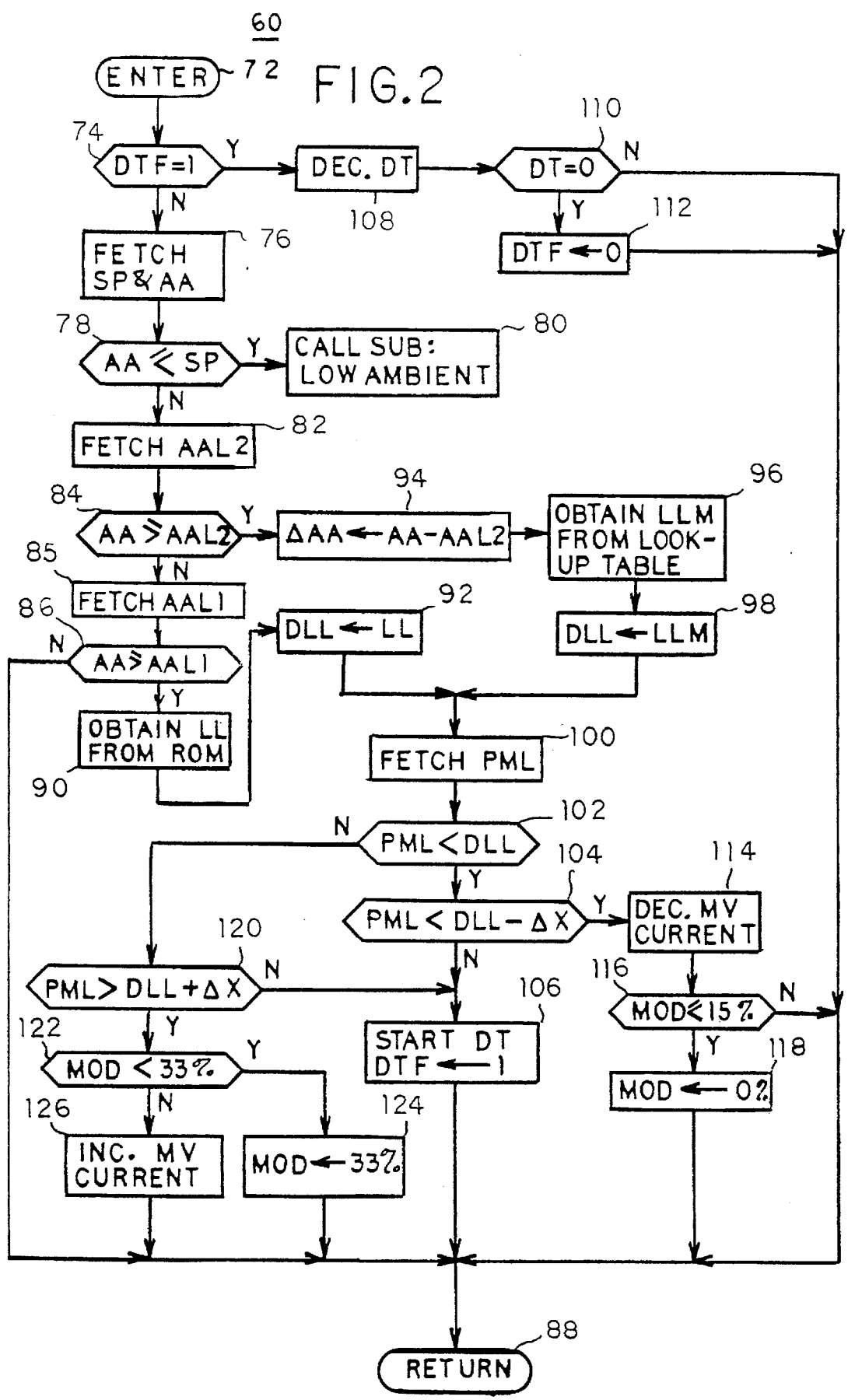
FIG. 2 is a detailed flow diagram of a program which operates the refrigeration unit of FIG. 1 according to a first embodiment of the invention.

FIG. 2 is a detailed flow diagram of a program 60 which implements the teachings of the invention relative to providing a dynamic prime mover load limit DLL during predetermined elevated ambient temperature conditions to reduce the chance of shutdown of unit 10 due to high compressor discharge pressure. A static prime mover load limit may be provided at a first elevated ambient temperature AA to protect the prime mover, such as 80° F. (26.7° C.) for example. The static prime mover load limit is then dynamically reduced as a function of increasing ambient temperature, when the ambient temperature AA increases to and above a predetermined second elevated ambient temperature, such as 100° F. (37.8° C.).

Figures 3, 4:
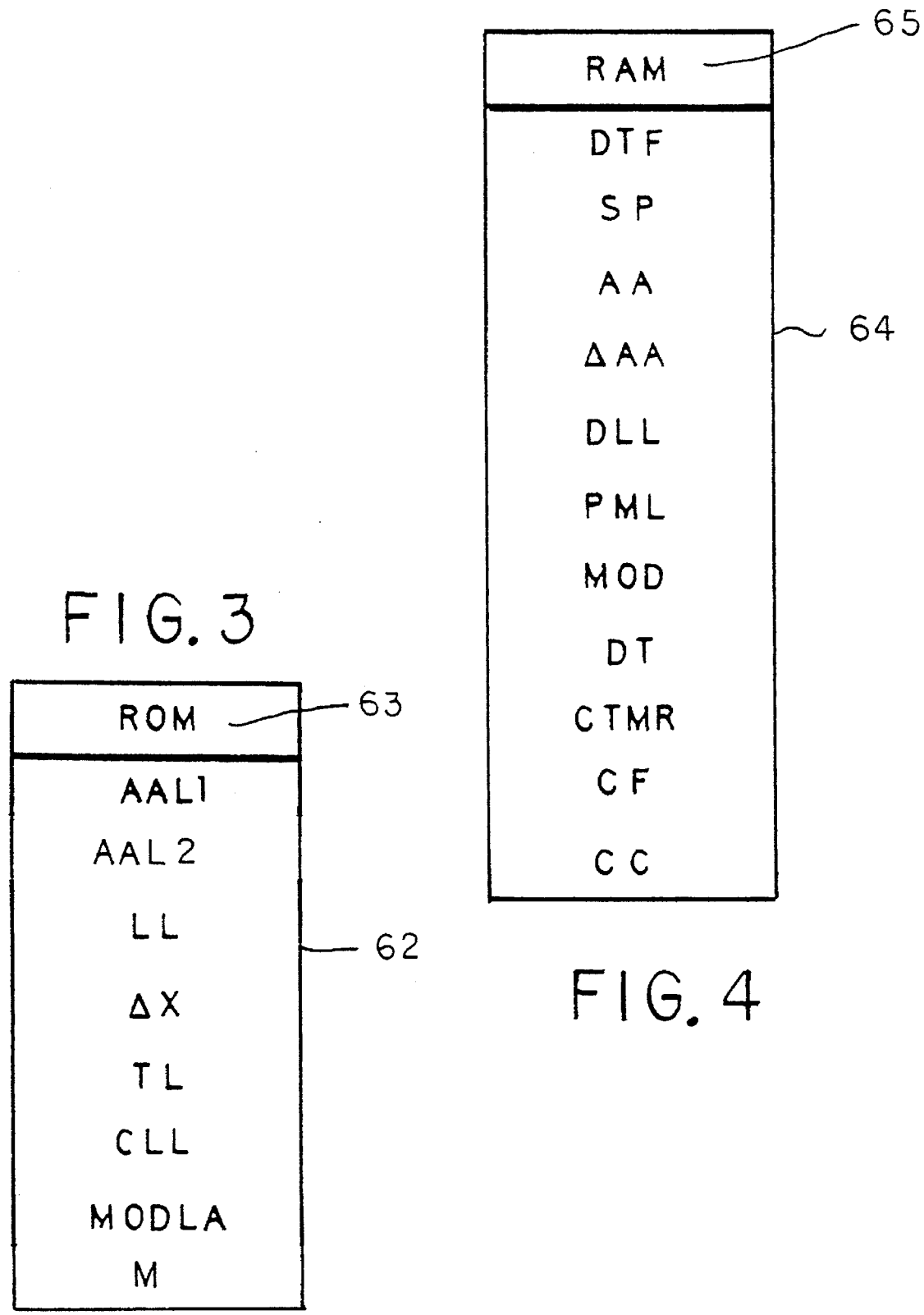
FIG. 3 is a ROM map illustrating certain constants which will be referred to during the description of the program shown in FIG. 1, as well as during the description of a program shown in FIG. 8.
FIG. 4 is a RAM map illustrating certain operating parameters of the refrigeration unit shown in FIG. 1, as well as program variables developed during the running of the programs shown in FIGS. 3 and 8.

During the description of program 60, FIGS. 3, 4, 5, 6 and 7 will also be referred to. FIG. 3 is a ROM map 62 which identifies certain constant values used by program 60 which are stored in a read-only memory (ROM) 63 associated with refrigeration control 30. FIG. 4 is a RAM map 64 which lists certain sensed signals, timers, counters, and program variables developed during the operation of program 60 and stored in a random access memory (RAM) 65 associated with refrigeration control 30. FIG. 5 is a ROM look-up table 66 stored in ROM 63 which is used by program 60 when the prime mover 14 includes the electric motor 16 shown in FIG. 1A, with the load signal PML being in amperes. FIG. 6 is a ROM look-up table 68 stored in ROM 63 which is used by program 60 when the prime mover 14 includes the internal combustion engine 22 shown in FIG. 1B, wherein the load signal PML is in engine RPM. FIG. 7 is a ROM look-up table 70 stored in ROM 63 which is used by program 60 when the prime mover 14 includes the internal combustion engine 22 shown in FIG. 1C, wherein the load signal PML is in ° C.

Figure 8:
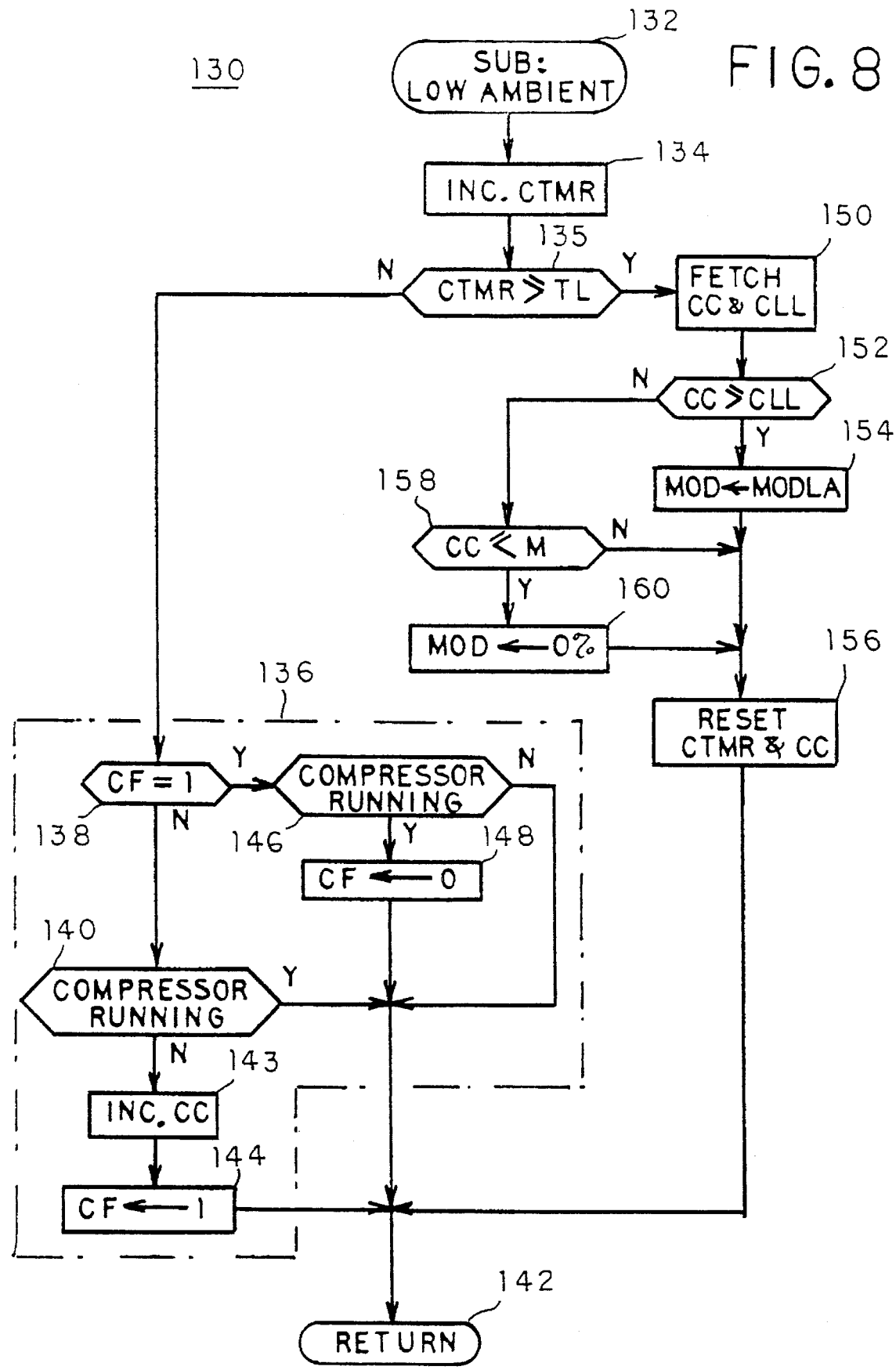
FIG. 8 is a detailed flow diagram of a program which is called by the program shown in FIG. 3, in response to predetermined low ambient temperature conditions, in order to prevent excessive on/off cycling of the refrigeration unit while conditioning a frozen load via a start/stop cycling mode of operation.

Program 60 is entered periodically at 72 and step 74 checks a delay timer flag DTF to determine if a delay timer DT is active. At this point in program 60 delay timer DT will not be active and thus delay timer flag DTF will be found to be reset, ie., a logic zero. Step 74 then advances to step 76 which fetches the set point temperature SP selected by set point temperature selector 34, and the ambient temperature AA as provided by temperature sensor 46. Step 78 compares AA with SP. In a predetermined low ambient temperature condition, such as when AA is equal to or less than SP, step 78 branches to a step 80 which calls a subroutine LOW AMBIENT. Subroutine LOW AMBIENT is shown in FIG. 8, and will be hereinafter described. It will be assumed that during the present running of program 60 that AA is greater than SP, and step 78 thus advances to a step 82.

Step 82 fetches a constant AAL2 from ROM 63, with constant AAL2 being an elevated ambient temperature which initiates modification of a static prime mover load limit LL to reduce the chance of a HPCO shutdown, such as 100° F. (37.8° C.). It will be assumed that step 84 finds AA is less than AAL2 and step 84 then proceeds to step 85 which fetches a constant AAL1 from ROM 63. Constant AAL1 is an elevated ambient temperature, lower than AAL2, which triggers the use of a static prime mover load limit LL to protect prime mover 14. Step 86 then compares AA with AAL1. It will be assumed that step 86 finds that AA is less than AAL1, and step 86 then proceeds to program exit 88, as suction line modulation is not necessary to protect the prime mover 14, or to reduce the chance of a HPCO stop of refrigeration unit 10.

Suction line modulation may be utilized by an applicable temperature control algorithm as the temperature of conditioned space 32 approaches the set point temperature SP, as illustrated in the temperature control algorithms shown in the incorporated U.S. Pat. No 4,977,752.

Now it will be assumed that the ambient temperature AA has increased to the first ambient temperature trigger value AAL1, but is less than the second ambient temperature trigger value AAL2. Step 86 then proceeds to a step 90 which obtains the static load limit LL from ROM 63. Step 92 then sets the dynamic load limit DLL to the value of LL. Using the electric motor 16 shown in FIG. 1A as an example, with a 7½ HP, 230 volt AC motor, the static load limit may be 27 amperes, for example. Thus, as long as the ambient temperature AA is between AAL1 and AAL2, the dynamic load limit will be equal to the static load limit LL. Should the ambient temperature continue to rise and reach or exceed the higher trigger value AAL2, such as 100° F. (37.8° C.), step 84 will branch to a step 94 which determines the difference ΔAA between AA and AAL2. Step 96 then accesses the applicable look-up table shown in FIGS. 5, 6 and 7 to determine a modified load limit LLM. Using the electric motor 16 shown in FIG. 1A as an example, step 96 would access ROM look-up table 66 shown in FIG. 5, using the value of ΔAA to access the table. As illustrated in FIG. 5, a suitable dynamic load limit LLM for electric motor 16 reduces the prime mover load limit by 1 ampere, starting at the static limit LL, for every 2 degree increase in ΔAA above AAL2.

When the operable prime mover 14 is engine 22, and engine speed is used as an indication of load, step 96 would access ROM look-up table 68 shown in FIG. 6 to obtain a modified load limit LLM in RPM. When the operable prime mower 14 is engine 22, and the temperature of the engine exhaust gases is used as an indication of load, step 96 would access ROM look-up table 70 shown in FIG. 7 to obtain a modified load limit LLM in ° C.

After obtaining the appropriate modified load limit LLM in step 96, a step 98 sets the dynamic load limit signal DLL to the value of LLM.

Steps 92 and 98 both advance to a step 100 which fetches the actual load PML on prime mover 14. A step 102 then compares the actual load PML with the dynamic load limit DLL as prepared in either step 92 or step 98, as a function of the value of the ambient temperature AA. It will first be assumed that PML is less than DLL and step 102 advances to a step 104, which determines if the actual load PML is within a predetermined tolerance ΔX of the dynamic limit DLL. With electric motor 16 as the operable prime mover, the tolerance ΔX may be 1 ampere, for example. The selected tolerance prevents changing the control current in modulation valve MV too often. When step 104 finds that the actual load PML is within the predetermined tolerance of the dynamic limit DLL, step 104 proceeds to a step 106 which activates the hereinbefore mentioned delay timer DT, such as by loading it with a predetermined value. Step 106 also sets the delay timer flag DTF, and step 106 then proceeds to the program exit or return 88.

On the next running of program 60, step 74 will find delay timer flag DTF set, and step 74 then branches to a step 108 which decrements the value loaded into delay timer DT, and a step 110 determines when delay timer DT has been decrement to zero. When delay timer DT has not been decremented to zero, step 1.10 exits program 60 at 88. When step 110 finds that the predetermined delay time period has expired, a step 112 resets the delay timer flag DTF, so that on the next running of program 60, step 74 will again proceed to step 76.

When step 104 finds that the actual prime mover load PML is less than DLL by an amount greater than the tolerance ΔX, a step 114 decrements the present value of the control current flowing in the control coil of the modulation valve MV, by a predetermined step value. A step 116 then determines if this step of decrementing the control current has reduced the percent modulation to a predetermined value, such as 15%, for example. Refrigeration control 30 either calculates the percent suction line modulation and stores it as a signal MOD, or control 30 accesses an appropriate look-up table stored in ROM 63, which is prepared for the specific modulation valve MV being used, using the value of the control current to access the table. The predetermined value compared with MOD in step 116 is selected such that when the modulation has been reduced to this value, the modulation might as well be reduced to 0%, as it is no longer necessary to provide suction line modulation to protect the prime mover or to prevent shutdown due to opening of the HPCO.

Accordingly, when step 116 finds that the percent modulation has been reduced to the predetermined value, eg., 15% or lower, a step 118 sets the modulation MOD to 0%, and the control current is accordingly reduced to 0 by control 30. When step 116 finds the modulation MOD is greater than 15%, step 116 exits program 60 at 88, as does step 118. Step 114 will continue to decrement the coil control current on each subsequent running of program 60 until step 104 finds that the actual load PML is within the established tolerance of DLL, or step 116 finds that MOD has been reduced to 15% or less.

When step 102 finds that the actual load PML on prime mover 14 equals or exceeds the dynamic load limit DLL, step 102 branches to a step 120. Step 120 determines if PML exceeds DLL by the tolerance ΔX. If PML is within the tolerance, step 120 proceeds to the hereinbefore described step 106 which activates the delay timer DT. Thus, steps 120 and 104, in the case of electric motor 16, establish a ±1 ampere window about DLL. When the actual load PML is within this window, no change is made to MOD, and thus no change is made to the percent suction line modulation.

When step 120 finds that PML exceeds DLL by an amount greater than the tolerance ΔX, step 122 determines if MOD is less than a predetermined value, such as 33%. This predetermined value is selected to be the initial step from 0% modulation, when suction line modulation is found to be necessary by program 60. Thus, when step 122 finds MOD is less than 33%, step 122 proceeds to a step 124, which sets MOD equal to 33%, and control 30 will increase the control current in modulation valve to provide 33% suction line modulation.

When step 122 finds that MOD is not less than 33%, step 126 increments the control current in modulation valve MV by a predetermined increment. Step 126 will then increment the control current in modulation value MV during each subsequent running of program 60, until step 120 finds that the actual load PML on the prime mover 14 has been reduced such that it is within the tolerance window provided about the dynamic load limit DLL.

When step 78 finds that a predetermined low ambient condition exists, such as the ambient temperature AA being equal to or less than the set point temperature SP, step 78 branches to step 80 which calls the subroutine LOW AMBIENT shown in FIG. 8. Subroutine LOW AMBIENT is a program 130 which detects excessive on-off cycling of refrigeration unit 10 when refrigeration unit 10 is conditioning a load which does not require continuous operation of refrigeration unit 10, such as a frozen load. With such a load, a mode selector switch in control 30 is set to operate refrigeration unit in a start-stop cycling mode to conserve fuel. With a low ambient temperature, hovering about the set point temperature, excessive on-off cycling may occur, which is harmful to the components of refrigeration unit. Program 130 detects excessive cycling and increases suction line modulation MOD to a predetermined high percent MODLA, to keep unit 10 running longer and thus reduce the rate of on-off cycling.

Program 130 is entered at 132 when called by step 80 and a step 134 increments a cycle timer CTMR. A step 135 compares the time on timer CTMR with a constant time value TL, such as 5 minutes, for example, with TL being obtained from ROM 63. The constant time value TL establishes the time over which the stops of refrigeration unit 10 are counted, to determine the on-off cycling rate of refrigeration unit 10. When step 135 finds that the cycle time limit TL has not been reached, step 135 advances to a portion 136 of program 130 which counts the number of times unit 10 is shut down, stopping compressor 12 to initiate a NULL cycle, during the selected time value TL.

Portion 136 of program 130 includes a step 138 which checks a flag CF to determine if flag CF is reset or set. At this point it will be assumed that flag CF is not set, and step 138 proceeds to a step 140 which determines if compressor 12 is running. When step 140 finds compressor 12 running, program 130 is exited at program return 142. Program 130, during each cycle time interval TL, will continue to cycle through steps 138 and 140 to program return 142 until step 140 finds that unit 10 has been shut down. Step 140, upon finding that compressor 12 is not running, branches to a step 143 which increments the count value of a counter CC. A step 144 then sets flag CF, to indicate that the present stop has been counted, and step 144 proceeds to program exit 142.

Upon the next running of program 130 step 138 will now find flag CF set and branch to a step 146 which determines when unit 10 is started and compressor 12 starts to run again. As long as compressor 12 is not running, step 146 proceeds to program exit 142. When unit 10 is started, a step 146 proceeds to step 148 which resets flag CF, and step 148 proceeds to program return 142. Thus, on the next running of program 130, step 138 will again advance to step 140 to detect when unit 10 is again shut down. Thus, the number of stops during a predetermined time interval TL are counted, until the time interval TL expires, as detected by step 135.

Step 135, upon detecting expiration of the predetermined time interval TL, proceeds to a step 150 which fetches the count on counter CC and a count limit CLL. The count limit CLL, is a constant stored in ROM 63. CLL, for example, may be 3, when TL is 5 minutes. A step 152 compares the count CC of the stops of unit 10 during the time interval TL, and if the count CC has reached or exceeded the count limit CLL, step 152 proceeds to a step 154 which sets the modulation MOD to a predetermined percent MODLA, with the predetermined percent MODLA being a constant stored in ROM 63. MODLA, for example, may be 50%. MODLA is a relative high percent, selected to keep unit 10 operating longer during the low ambient condition. Step 154 then proceeds to a step 156 which resets the cycle timer CTMR and the counter CC, to start a new time period TL over which the stops of unit 10 are again counted, starting from zero. While only one modulation step is shown in FIG. 8, once this first modification step has been taken, if step 152 still finds the cycle rate excessive, the control current in modulation valve MV may be incremented in predetermined steps above the initial step, as described relative to program 60 in FIG. 2.

Of course, it is not desired to keep unit 10 running continuously, since the cycle mode was selected to conserve fuel. Thus, when step 152 finds that counter CC has not reached the count limit CLL during the time period TL, step 152 proceeds to step 158 which compares the count on counter CC with a predetermined constant M stored in ROM 63. The value of constant M, which may be 1, for example, when TL is 5 minutes, is selected as the lower limit for the number of stops during time period TL. When step 158 finds that the count on counter CC is between M and CLL, which is the desired condition, step 158 proceeds to step 156. Should step 158 find that unit 10 is not stopping enough, ie., the value of counter CC is equal to, or less than the minimum count M, step 158 proceeds to step 160 which sets MOD to some value less than MODLA. For example, step 160 may simply set MOD to 0%, or it may decrement the control current in modulation valve MV, until a certain percent modulation is reached, at which point MOD would be set to 0%, as hereinbefore described relative to program 60 in FIG. 2.

We claim:

1. A method of controlling refrigerant pressure during elevated ambient temperature conditions in a refrigeration unit having a refrigerant compressor driven by a prime mover, with the refrigerant compressor having discharge and suction ports connected to a refrigerant flow path which includes controllable suction line modulation, comprising the steps of:

detecting the actual load PML on the prime mover, sensing the ambient temperature AA, providing a dynamic load limit DLL as a function of the ambient temperature AA, comparing the actual load PML with the dynamic load limit DLL, and changing the suction line modulation as a function of the comparison step, to change the load on the prime mover in an attempt to maintain the refrigerant pressure of the refrigeration unit below a predetermined value.

2. The method of claim 1 including the steps of:

sensing the refrigerant pressure, and stopping the unit when the sensing step finds the refrigerant pressure has reached the predetermined value, wherein the step of changing the suction line modulation changes the load on the prime mover as required to reduce the chance of the refrigerant discharge pressure reaching the predetermined value which triggers the step of stopping the refrigeration unit.

3. The method of claim 1 wherein the step of changing the suction line modulation as a function of the comparison step changes the suction line modulation as required to maintain a predetermined relationship between the actual load PML on the prime mover and the dynamic load limit DLL.

4. The method of claim 1 wherein the step of providing a dynamic load limit DLL as a function of ambient temperature AA includes the steps of:

providing a default load limit LL, providing an ambient temperature limit AAL2, comparing the ambient temperature AA with the ambient temperature limit AAL2, using the default load limit LL as the dynamic load limit DLL when the comparison step finds the ambient temperature AA is less than the ambient temperature limit AAL, providing a modified load limit LLM as a function of the difference between the ambient temperature AA and the ambient temperature limit AAL, when the comparison step finds the ambient temperature is not less than the ambient temperature limit AAL, and using the modified load limit LLM, when provided by the providing step, as the dynamic load limit DLL.

5. The method of claim 4 including the step of providing an ambient temperature limit AAL1 which is less than the ambient temperature limit AAL2, wherein the step of using the default load limit is used only when the ambient temperature AA is between AAL1 and AAL2.

6. The method of claim 1 wherein the prime mover is an electric motor, with the step of detecting actual load PML on the prime mover including the step of measuring the electrical current drawn by the electric motor.

7. The method of claim 1 wherein the prime mover is an internal combustion engine, with the step of detecting actual load PML on the prime mover including the step of measuring the speed of the internal combustion engine.

8. The method of claim 1 wherein the prime mover is an internal combustion engine, with the step of detecting actual load PML on the prime mover including the step of measuring the temperature of engine exhaust gases.

9. The method of claim 1 including the steps of:

operating the refrigeration unit in a cycling start-stop mode to maintain the temperature of a conditioned space in a predetermined range adjacent to a selected set point temperature SP, comparing the ambient temperature AA with the set point temperature SP, determining the on-off cycling rate of the refrigeration unit when the comparison step finds the ambient temperature AA has a predetermined relationship with the set point temperature SP, providing a cycling rate upper limit, comparing the on-off cycling rate with the cycling rate upper limit, and increasing the suction line modulation when the comparison step finds the cycling rate has a predetermined relationship with the cycling rate upper limit.

10. The method of claim 9 wherein the step of increasing the suction line modulation increases the suction line modulation to a predetermined percent.

11. The method of claim 9 wherein the predetermined relationship of the ambient temperature AA relative to the set point temperature SP which initiates the step of determining the on-off cycling rate of the refrigeration unit is the ambient temperature AA being equal to or less than the set point temperature SP, and the predetermined relationship of the cycling rate with the cycling rate upper limit which initiates the step of increasing the suction line modulation to a predetermined percent is the cycling rate reaching the cycling rate limit.

12. The method of claim 9 including the steps of:

providing a cycling rate lower limit, comparing the cycling rate with the cycling rate lower limit, and decreasing the suction line modulation when the comparison step finds the cycling rate has a predetermined relationship with the cycling rate lower limit.

13. The method of claim 12 wherein the step of decreasing the suction line modulation decreases the suction line modulation to a predetermined percent, and the predetermined relationship of the cycling rate with the cycling rate lower limit is the cycling rate dropping until it reaches the cycling rate lower limit.

14. A method of preventing excessive on-off cycling of a refrigeration unit which operates in a cycling start-stop mode to maintain the temperature of a conditioned space in a predetermined range adjacent to a selected set point temperature SP, comprising the steps of:

sensing the ambient temperature AA, comparing the ambient temperature AA with the set point temperature SP, determining the on-off cycling rate of the refrigeration unit when the comparison step finds the ambient temperature AA has a predetermined relationship with the set point temperature SP, providing a cycling rate upper limit, comparing the on-off cycling rate with the cycling rate upper limit, and increasing the suction line modulation when the comparison step finds the cycling rate has a predetermined relationship with the cycling rate upper limit.

15. The method of claim 14 wherein the step of increasing the suction line modulation increases the suction line modulation to a predetermined percent.

16. The method of claim 14 wherein the predetermined relationship of the ambient temperature AA relative to the set point temperature SP which initiates the step of determining the on-off cycling rate of the refrigeration unit is the ambient temperature AA being equal to or less than the set point temperature SP, and the predetermined relationship of the cycling rate with the cycling rate upper limit which initiates the step of increasing the suction line modulation to a predetermined percent is the cycling rate reaching the cycling rate limit.

17. The method of claim 14 including the steps of:

providing a cycling rate lower limit, comparing the cycling rate with the cycling rate lower limit, and decreasing the suction line modulation when the comparison step finds the cycling rate has a predetermined relationship with the cycling rate lower limit.

18. The method of claim 17 wherein the step of decreasing the suction line modulation decreases the suction line modulation to a predetermined percent, and the predetermined relationship of the cycling rate with the cycling rate lower limit is the cycling rate dropping until it reaches the cycling rate lower limit.

* * * * *